April 25, 1939. L. P. EVANS 2,155,644
SOLVENT REFINING HYDROCARBON OIL
Filed Feb. 19, 1937
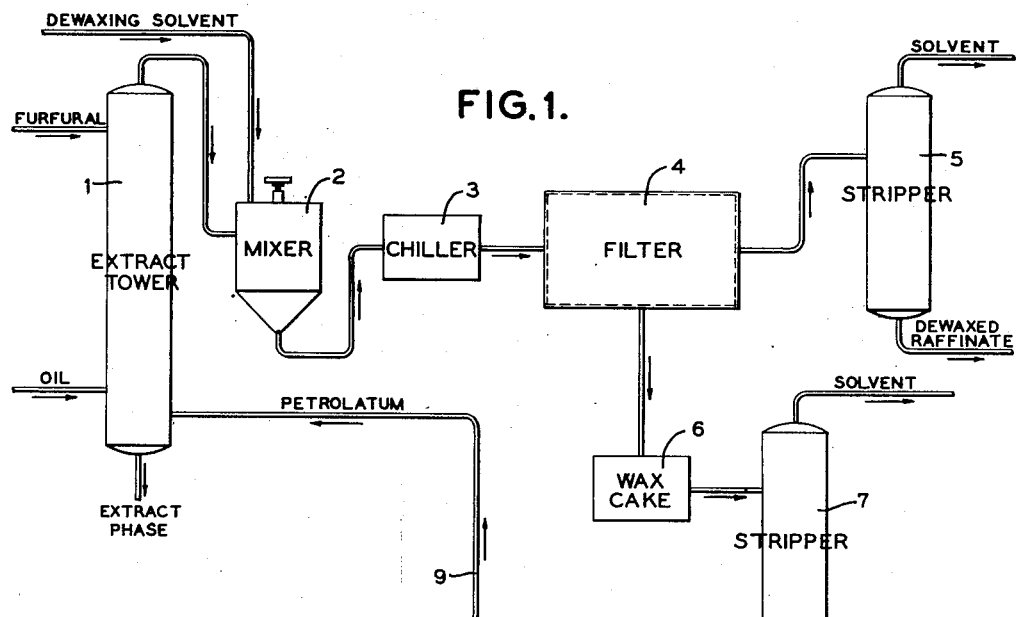
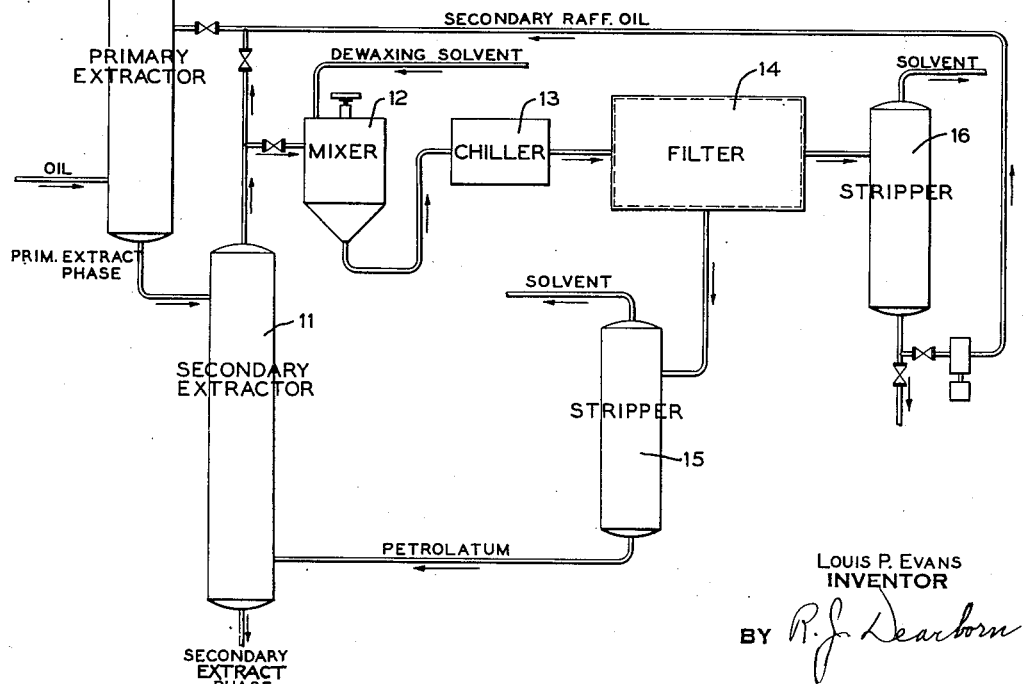
Louis P. Evans
INVENTOR
BY R. J. Dearborn
ATTORNEY Patented Apr. 25, 1939

2,155,644

UNITED STATES PATENT OFFICE 2,155,644

SOLVENT REFINING HYDROCARBON OIL

Louis P. Evans, Beacon, N. Y., assignor to The Texas Company, New York, N. Y., a corporation of Delaware Application February 19, 1937, Serial No. 126,551

1 Claim. (Cl. 196—13)

This invention relates to a method of refining mineral oil by solvent extraction.

It contemplates solvent extraction of hydrocarbon oil in the presence of a high molecular weight hydrocarbon material adapted to facilitate the separation of the oil undergoing treatment into fractions of different characteristics.

The invention concerns a process of extracting oil with a selective type of solvent, such as furfural, in the presence of a high molecular weight hydrocarbon material. This high molecular weight hydrocarbon material advantageously comprises liquid petrolatum or slack wax. The invention has particular reference to the extraction of mineral lubricating oil with a selective solvent in the presence of liquefied waxy concentrate for the purpose of separating the oil into fractions which are respectively rich in paraffinoid and non paraffinoid constituents of the oil.

The invention involves effecting the extraction at a temperature substantially above the melting point of the petrolatum and slack wax; that is, at temperatures of 150° F. and above. Selective solvents suitable for carrying out the process are those which are completely miscible with the oil at relatively high temperatures and such that they exert selective action as between low and high viscosity index constituents of the oil at temperatures substantially above the melting point of the petrolatum or slack wax. Furfural is particularly suitable as a selective solvent, although it is contemplated that certain other solvents, such as phenol, aniline, furfuryl acetate, may be employed since they exert selective action at relatively high temperatures.

Liquid petrolatum or slack wax, suitable for the purpose of this invention, is such as derived from the dewaxing of wax-bearing mineral oil, and preferably consists of a waxy concentrate which has been deoiled. For example, a slack wax, such as obtained by washing with a solvent the filter cake of solid hydrocarbons obtained in a filtering operation for the removal of wax from lubricating oil stocks. This material may be characterized by having a specific gravity ranging from about .840 to .940 at a temperature of 25° C. It comprises, for example, paraffin hydrocarbons corresponding in molecular structure to tetradecane and its higher homologs up through pentatriacontane. Such compounds have the formula $C_{14}H_{30}$ to $C_{35}H_{72}$.

In addition, however, to the normal straight chain paraffins, the high molecular weight material may contain compounds comprising paraffin chains linked to one or more cyclic groups; in other words, compounds comprising molecules of complex character and branched structure. In general, these compounds are characterized by having a high viscosity index and high melting point.

The invention also contemplates a method in which the oil to be treated is subjected to a primary extraction with a selective solvent during which the oil is separated into extract and raffinate phases. The raffinate phase so obtained comprises the relatively paraffinoid oils, mixed with some solvent, while the extract phase comprises the relatively non-paraffinoid hydrocarbons dissolved in the bulk of the solvent. This extract phase, however, contains substantial amounts of paraffinic oil, particularly where the extraction has been effected at relatively high temperatures. Accordingly, it is contemplated subjecting this extract phase to a secondary extraction with liquid petrolatum with the consequent separation into secondary extract and raffinate phases.

The secondary extract phase comprises constituents of non-paraffinoid character. The secondary raffinate phase, on the other hand, comprises oil of intermediate character. This oil, after separation from the small amount of solvent and the petrolatum, may be disposed of as a separate product, or it may be returned to the primary extraction tower for further treatment.

In some cases, it may be desirable to return this secondary raffinate phase itself to the primary extraction tower, either wholly or in part.

The object of my invention, therefore, is to use the liquid petrolatum or high molecular weight material as a solvent for paraffinic constituents of the oil undergoing treatment, and particularly as a solvent for these paraffinic constituents of intermediate character which are normally retained in the extract phase.

High molecular weight hydrocarbons, such as those found in liquid petrolatum, are relatively immiscible with a solvent, such as furfural, at temperatures in the range 150° to 230° F. On the other hand, the oil constituents of intermediate character are more soluble in the liquid petrolatum than they are in the extraction solvent and extract oil comprising the extract phase. Hence, the presence of the liquid petrolatum modifies the phase distribution ratio so that the oil of intermediate character passes from the extract phase to the raffinate phase.

In order to further illustrate the method of my invention, reference will now be made to the accompanying drawing showing a flow diagram for the process.

As shown in Figure 1, the oil to be extracted, for example, a lubricating oil fraction, is introduced from a source not shown to the lower portion of an extraction tower 1 wherein it is brought into countercurrent contact with furfural introduced to the upper portion of the tower from a source not shown. This tower is advantageously packed with suitable packing material, such as Raschig rings, in order to effect intimate mixing between the oil and the solvent. The temperature conditions are maintained so as to keep the lower portion of the tower at a temperature of around 150° F., while the upper portion of the tower is at a temperature of around 300° F.

Liquid petrolatum from a source which will be described in more detail is also introduced to the lower portion of the tower at a point below the point of oil introduction. The point at which the petrolatum is introduced is sufficiently above the bottom of the tower so as to provide space for settling and separation into phases.

As a result of contact between oil and solvent, separation into phases occurs. The extract phase accumulates at the bottom of the tower and comprises low viscosity index constituents of the oil dissolved in the bulk of the furfural. This material is continuously withdrawn and subjected to such further treatment, as may be desired, including recovery of the solvent.

The raffinate phase comprising the high viscosity index, or relatively paraffinoid oil, accumulates in the top of the tower. It also contains the petrolatum being introduced to the lower portion of the tower. Consequently, it is desirable to subject the raffinate phase to further treatment to effect removal of the petrolatum.

In carrying out this further treatment, the raffinate phase is conducted to a mixer 2 wherein it is mixed with a further quantity of solvent for the purpose of effecting the subsequent dewaxing step. This solvent comprises, among other things, a substantial amount of benzol to form with the selective solvent already present in the raffinate phase a solvent mixture which, upon chilling, will have the desired selective action as between wax and oil. It may be necessary to add additional quantities of the extraction solvent or of some other solvent liquid having the required anti-solvent action for wax, such as aliphatic ketones of the character of acetone and methyl ethyl ketone.

From the mixer 2, the mixture is conducted to a chiller 3 wherein it is chilled to the necessary temperature to precipitate the petrolatum constituents and, at the same time, produce an oil having the desired low pour test. For example, the chilling temperature may be around 0° to −20° F. This chilling temperature, however, will depend upon the solid point of the liquid petrolatum constituents.

The chilled mixture is then introduced to a filter 4 wherein the petrolatum or wax constituents are removed as a filter cake which may be washed in situ with a suitable wash solvent in order to effect deoiling of the petrolatum. The resulting filtrate is conducted to a stripper 5 for the recovery of the solvent therefrom and the production of a dewaxed raffinate, as indicated.

The wax cake from the filter 4 collects in a tank 6 from which it is conducted to a stripper 7. Any remaining solvent is stripped from the wax or petrolatum, and the stripped constituents are removed to a tank 8.

From the tank 8, the petrolatum is returned by a pump through the pipe 9 to the lower portion of the extraction tower 1, previously described.

Figure 2 illustrates a modification of the process already described. In this case, the oil and furfural are introduced to a primary extractor 10, similar to tower 1 previously described. The extract phase collecting at the bottom of the extractor 10 is withdrawn and conducted to the upper portion of a secondary extractor 11 wherein it is brought into countercurrent contact with liquid petrolatum introduced to the lower portion of the extractor 11. Secondary raffinate and extract phases are removed from the top and bottom respectively of this extractor.

The secondary raffinate phase, however, may be conducted, all or in part, to the primary extractor 10, as indicated. On the other hand, the secondary raffinate phase may be conducted to a mixer 12 wherein it is mixed with additional solvent liquid for dewaxing. The resulting mixture is conducted to a chiller 13, and from there to a filter 14. The wax constituents are removed as a filter cake, and the resulting filter cake is discharged and conducted to a stripper 15 to effect removal of retained solvent. The stripped material is conducted from the bottom of the stripper 15 and introduced to the lower portion of the secondary extractor 11, as previously described.

The filtrate from the filter 14 is likewise conducted to a stripper 16 wherein the solvent is recovered. The stripped oil, designated as a secondary raffinate oil, is withdrawn from the stripper and may be returned, all or in part, to the primary extractor 10 for recycling therethrough.

Where the secondary raffinate phase containing the petrolatum constituents is introduced to the primary extractor 10, the resulting primary raffinate phase will, of course, contain the petrolatum. In this connection, it will be necessary to subject the primary raffinate phase to a treatment similar to that described in connection with the raffinate phase in Figure 1.

It is contemplated that the charge oil to be extracted may be a wax-bearing oil, either distillate or residual, and in which case the primary raffinate phase will be comparatively rich in wax. Therefore, it can be dewaxed in the manner already described. A portion of the wax constituents ultimately removed will provide the petrolatum which it is desired to recycle through the system.

It is, of course, contemplated that the petrolatum used as the extraction aid may be derived from some other source, or from some unrelated dewaxing operation.

In carrying out the process, when extracting a distillate lubricating oil stock with furfural, the primary extraction is preferably carried out at a temperature ranging from 150° to 300° F.

Where the primary extract phase is subjected to countercurrent extraction with the liquid petrolatum in the secondary extractor, the temperatures in the secondary extraction are maintained in the range 150° to 230° F.

It is, of course, understood that the temperatures may be varied. In any case, the temperatures are such that they range above the melting point of the liquid petrolatum used as the extraction aid.

The ratio of furfural to oil used in carrying out the primary extraction is generally two to four parts of solvent to one part of oil by volume, and the liquid petrolatum used in the second extraction stage is in the ratio of about one to two parts of petrolatum to one part of primary extract phase.

In carrying out the secondary extraction, it is advantageous to maintain a temperature differential throughout the extractor so that the higher temperature prevails in the upper portion of the extractor 11. These temperatures can be controlled by heating or cooling the incoming oil and solvent, as the case may be.

Obviously, many modifications and variations of the invention, as hereinbefore set forth, may be made without departing from the spirit and scope thereof, and therefore only such limitations should be imposed as are indicated in the appended claim.

I claim:

In the refining of mineral lubricating oil containing naphthenic and paraffinic constituents, the method comprising extracting the oil with furfural in a primary extraction zone, forming a primary raffinate phase rich in paraffinic constituents and a primary extract phase containing the naphthenic and less paraffinic constituents mixed with the bulk of the furfural, removing said primary phases, subjecting the primary extract phase to reextraction in a secondary extraction zone with a solvent comprising paraffin hydrocarbons containing from 14 to 35 carbon atoms in the molecule at a temperature of around 200° F. and above, forming a secondary raffinate phase comprising paraffinic hydrocarbons, including the aforesaid high molecular weight hydrocarbons, and a secondary extract phase comprising naphthenic constituents, removing said secondary phases, dewaxing the secondary raffinate phase to separate therefrom the high molecular weight paraffin hydrocarbons and produce a liquid paraffinic oil of intermediate character, and returning the oil of intermediate character to the primary extraction zone for further contact with furfural in the presence of fresh charge.

LOUIS P. EVANS.